US012427400B2

(12) United States Patent
Martineck, Sr. et al.

(10) Patent No.: US 12,427,400 B2
(45) Date of Patent: Sep. 30, 2025

(54) SYSTEM AND METHOD FOR COMPOSING PERSONALIZED SCRATCH-OFF LOTTERY TICKETS

(71) Applicant: Scientific Games, LLC, Alpharetta, GA (US)

(72) Inventors: Jeffrey D. Martineck, Sr., Johns Creek, GA (US); Scott B. Garrison, Duluth, GA (US)

(73) Assignee: Scientific Games, LLC, Alpharetta, GA (US)

( * ) Notice: Subject to any disclaimer, the term of this patent is extended or adjusted under 35 U.S.C. 154(b) by 6 days.

(21) Appl. No.: 18/665,635

(22) Filed: May 16, 2024

(65) Prior Publication Data

US 2024/0299836 A1 Sep. 12, 2024

Related U.S. Application Data

(62) Division of application No. 17/464,034, filed on Sep. 1, 2021, now Pat. No. 11,992,777.

(51) Int. Cl.
*A63F 3/06* (2006.01)
*G07F 17/42* (2006.01)

(52) U.S. Cl.
CPC .......... *A63F 3/0655* (2013.01); *A63F 3/0665* (2013.01); *G07F 17/42* (2013.01); *A63F 2003/066* (2013.01)

(58) Field of Classification Search
CPC .................. A63F 3/0655; A63F 3/0665; A63F 2003/066; G06F 7/42
See application file for complete search history.

(56) References Cited

U.S. PATENT DOCUMENTS

| | | | |
|---|---|---|---|
| 5,513,117 | A | 4/1996 | Small |
| 5,704,647 | A | 1/1998 | Desbiens |
| 5,772,510 | A | 6/1998 | Roberts |
| 6,958,014 | B1 | 10/2005 | Luciano et al. |
| 7,290,705 | B1 | 11/2007 | Shin |
| 9,821,577 | B1 | 11/2017 | Stephens |
| 9,914,046 | B2 | 3/2018 | Modawell et al. |
| 2003/0045340 | A1 | 3/2003 | Roberts |
| 2011/0272934 | A1 | 11/2011 | Lundgren et al. |
| 2012/0235400 | A1 | 9/2012 | Scrymgeour |
| 2016/0371610 | A1 | 12/2016 | Bronner |

(Continued)

OTHER PUBLICATIONS

EPO Search Report, Jan. 19, 2023.

*Primary Examiner* — Christopher E Mahoney
*Assistant Examiner* — Marissa Ferguson-Samreth
(74) *Attorney, Agent, or Firm* — Dority & Manning, P.A.

(57) ABSTRACT

An instant lottery ticket game system includes a set of scratch-off lottery ticket blanks, each lottery ticket blank having a front face and a back face and a game play area on the front face with play indicia that presents a pre-determined game outcome, the play indicia covered by a scratch-off coating (SOC). A coating layer is applied over at least the game play area such that an entirety of the front face presents an empty composition area void of lottery ticket indicia. The set of lottery ticket blanks are housed within an automated dispenser. An interface is configured with the dispenser and is in communication with a printer associated with the dispenser and accepts input of composition indicia from a patron for printing on portions of or the entirety of the front face to generate a finished scratch-off lottery ticket prior to dispensing the finished lottery ticket.

15 Claims, 7 Drawing Sheets

(56) References Cited

U.S. PATENT DOCUMENTS

| | | | |
|---|---|---|---|
| 2017/0007916 | A1 | 1/2017 | Modawell et al. |
| 2018/0012453 | A1 | 1/2018 | Anderson |
| 2019/0287335 | A1 | 9/2019 | Sandvick |

SYSTEM AND METHOD FOR COMPOSING PERSONALIZED SCRATCH-OFF LOTTERY TICKETS

RELATED APPLICATION

The present application is a Divisional application of U.S. application Ser. No. 17/464,034, filed Sep. 1, 2021, which is incorporated by reference herein in its entirety.

FIELD OF THE INVENTION

The present invention generally relates to a system and method for implementing a scratch-off ("instant") lottery ticket game, and more particularly to a system and method that provide personalized lottery tickets that can be composed at least in part by purchasers of the lottery tickets.

BACKGROUND

"Scratch-off" or "instant-win" lottery tickets have enjoyed immense popularity in the lottery industry for decades. These games offer distinct advantages to the lottery authorities and are attractive to a broad spectrum of players. The lottery tickets have a predetermined outcome that is revealed to the player upon removing a scratch-off coating from over game play indicia in a game play area on the ticket. Typically, such lottery tickets are printed with a game theme, such as a sports theme or treasure hunt game theme, that is reflected by the indicia (including images, graphics, and words) in the game play area and the other "real estate" areas on the front face of the ticket, such as the header and instruction areas of the ticket.

The types, formats, and games embodied on the scratch-off lottery tickets must continuously evolve and provide new and exciting gaming experiences to maintain current players and entice new players to the games. It would be beneficial to providers and sponsors of lottery ticket games to generate increased player excitement and enthusiasm by allowing the players to design their own personalized scratch-off lottery tickets without unduly complicating the manufacturing, distribution, and sale of the tickets to the public.

The present invention provides a system and method to address the above-cited need.

SUMMARY

Objects and advantages of the invention will be set forth in part in the following description, or may be obvious from the description, or may be learned through practice of the invention.

In one embodiment of the invention, an instant lottery ticket game system is provided and includes at least one set of scratch-off lottery ticket blanks, wherein each lottery ticket blank has a game play area with play indicia that presents a pre-determined outcome to the game embodied by the ticket. The play indicia in the game play area is covered by a scratch-off coating (SOC). A coating layer is applied over at least the game play area such that an entirety of the front face presents an empty composition area void of lottery ticket indicia. Thought of another way, viewed from the front face, the article gives no indication that it embodies a scratch-off lottery ticket.

The system includes an automated dispenser, wherein the set of lottery ticket blanks is housed within the dispenser. An interface is configured with the dispenser and is in communication with a printer operably associated with the dispenser. The interface is configured to accept input of composition indicia from a patron for printing in the composition area on the front face of the lottery ticket blank. The printer prints the composition indicia received from the patron on portions of or the entirety of the front face to generate a finished scratch-off lottery ticket prior to dispensing the finished lottery ticket.

In a particular embodiment, the coating layer is applied entirely over the front face of the lottery ticket blank and provides the empty composition area with a continuous single color appearance for the patron to compose the finished lottery ticket using the composition indicia.

In an alternate embodiment, the coating layer is applied only over the game play area and visually matches remaining portions of the front face such that the remaining portions and the coating layer define the empty composition area.

The coating layer may be any type of suitable primer coating that "hides" the SOC and any indicia in the game play area and presents a suitable surface for overprinting of the composition indicia thereon. It should thus be understood that the term "primer coating" is used herein generically to encompass any type or formulation of coating that achieves these purposes.

Embodiments of the game system may also include means for indicating to a player of the finished lottery ticket that the game play area is present on the front face of the finished lottery ticket. These means may vary. For example, in one embodiment, the means may include instruction indicia on the back face of the lottery ticket blank that indicates location of the game play area on the front face. The instruction indicia may also include instructions on how to play the game embodied by the game play indicia, prize awards, and generally any other information related to play of the game.

In another embodiment, the means may include a tactile feel imparted to the game play area that distinguishes the game play area from the remaining portions of the front face. For example, the tactile feel may be a "rough" feel as compared to other portions of the front face provided by a matte finish of the coating layer applied over the game play area.

In still another embodiment, the patron may be provided with the option to print indicia on the front face when composing the finished lottery ticket that indicates the location of the game play area.

In a particular embodiment of the game system, the dispenser includes a controller in communication with the interface and the printer, the controller configured to present a plurality of indicia templates to the patron via the interface, wherein the composition indicia input by the patron may be combined by the controller with the indicia template selected by the player and printed in the empty composition area by the printer.

The dispenser controller may be in communication with a central game server, wherein the indicia templates are updated or downloaded to the controller by the central game server.

In another embodiment, the indicia templates may include static indicia associated with a particular event or occasion, wherein the player input personalizes the static indicia. The indicia is "static" in that it is not changeable by the player input. For example, the static indica may include a "Happy Birthday" message and the player may input composition indicia to complete or modify the message with a particular name or other unique information provided by the player.

In yet another embodiment of the system, the dispenser interface and controller are configured to accept an external image (e.g., a digital picture) presented by the player as the player's composition indicia. This image may be, for example a digital image in an external storage device presented by the player, wherein the interface includes conventional means for communicating with the external storage device to accept the digital image (e.g., a USB port, Bluetooth connection, etc.).

In still other embodiments, the interface and controller can be configured to present to the player options for backgrounds or borders to be printed in the empty canvas template along with the composition indicia from the player. These backgrounds and borders may include any manner of design, color scheme, words, etc.

In another unique embodiment of the system, the interface and controller are configured to present to the player an option to purchase the lottery ticket blank without any additional printing on the front face. In other words, the front face is left completely blank (void of any indicia). This option provides the player with the ability to personalize the composition area post-purchase. For example, the player may wish to sketch or paint an image in the composition area, or attach a photograph in the area, and so forth.

The dispenser may include a plurality of the sets of scratch-off lottery ticket blanks for different games having a different purchase price and prize structure. For example, the dispenser may offer a $1, $5, $10, and $20 ticket, wherein each ticket is associated with a game having a different prize structure (i.e., greater prizes for more expensive tickets).

As with conventional scratch-off lottery tickets, each of the lottery ticket blanks may include a validation code that is linked to an electronic validation file associated with the lottery ticket blank, the validation file containing ticket-specific information for validation and pay-out on the lottery ticket blank.

The invention also encompasses various method embodiments for conducting an instant lottery ticket game, the methods including providing an automated dispenser with a set of scratch-off lottery ticket blanks, each lottery ticket blank having a front face and a back face, and a game play area on the front face with play indicia that presents a pre-determined game outcome, the play indicia covered by a scratch-off coating (SOC). The lottery ticket blanks include a coating layer applied over at least the game play area such that an entirety of the front face presents an empty composition area void of lottery ticket indicia. Via an interface configured with the dispenser and in communication with a printer associated with the dispenser, the method includes accepting input from a player containing composition indicia for printing in the composition area. The method includes printing the composition indicia from the player in the composition area to generate a finished scratch-off lottery ticket and then dispensing the finished lottery ticket from the dispenser.

In a particular embodiment of the method, the coating layer is applied entirely over the front face of the lottery ticket blank and provides the empty composition area with a continuous single color appearance for the patron to compose the finished lottery ticket using their composition indicia (or other indicia options provided to the patron).

In an alternate method, the coating layer is applied only over the game play area and includes a primer coating suitable for overprinting of the composition indicia thereon, the primer coating visually matching remaining portions of the front face such that the remaining portions and the coating layer define the empty composition area.

Embodiments of the method may include providing means for indicating to a player of the finished lottery ticket that the game play area is present on the front face of the finished lottery ticket. Such means may include, for example, a tactile feel imparted to the game play area that distinguishes the game play area from the remaining portions of the front face. The tactile feel may be provided by the coating layer. Alternate means may include providing instruction indicia on the back face of the lottery ticket blank or, at the option of the patron, on the front face of the lottery ticket blank.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The term "patron" is used herein to encompass a person that composes and purchases a finished lottery ticket as described herein. The term "player" is used herein to encompass a person that actually plays the finished lottery ticket. The patron and the player may be the same or different persons.

Figure 1:
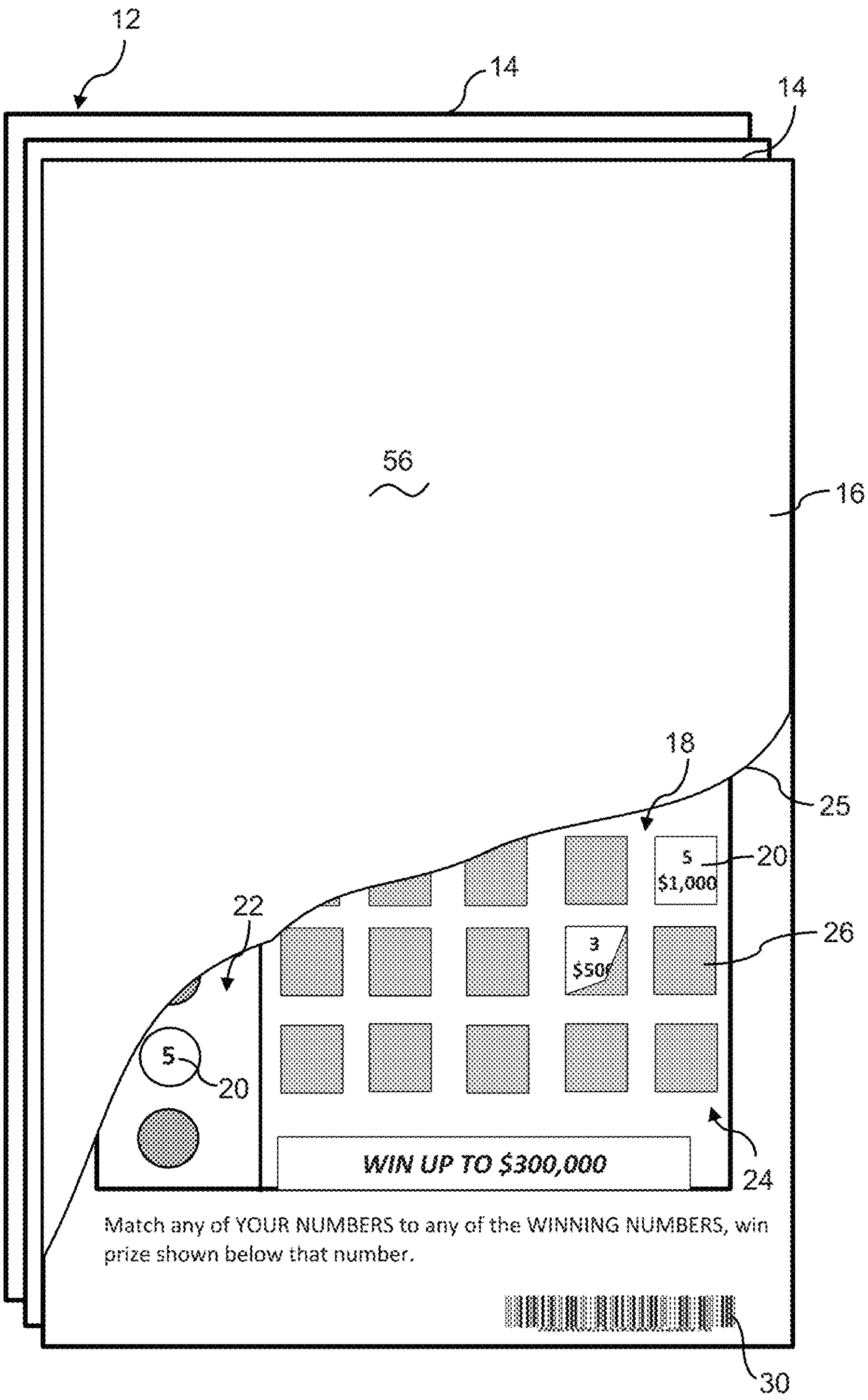
FIG. 1 depicts a set of instant scratch-off lottery ticket blanks for use in embodiments of the system and method of the present invention.
Figure 2:
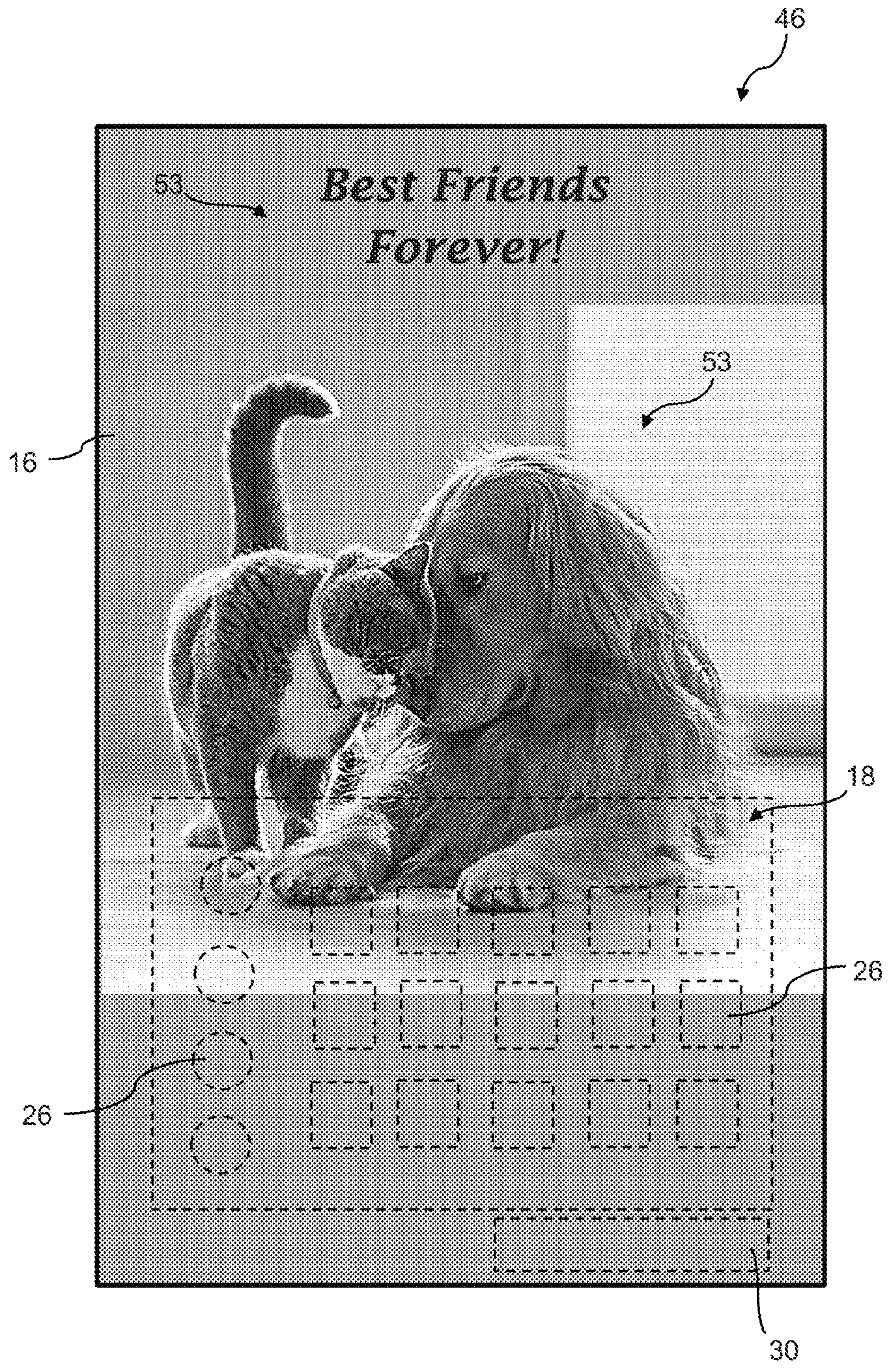
FIG. 2 depicts finished scratch-off lottery ticket in accordance with aspects of the present invention.

Generally, the present disclosure is directed to an instant lottery ticket game system 10 (FIG. 5) and associated method 100 (FIG. 7) wherein unique scratch-off lottery ticket blanks 14 (FIG. 1) are composition by a player to compose a finished lottery ticket 46 (FIG. 2).

Referring to FIG. 1, an embodiment of a lottery ticket blank 14 is depicted and includes a front face 16 with a game play area 18 having play indicia 20 printed therein that presents to the player a pre-determined outcome of the game embodied by the ticket blank 14. The lottery ticket blanks 14 may be provide in the form of a fan-folded stack 12 or roll of interconnected tickets.

The concept and various forms/styles of scratch-off lottery tickets are well-known to those skilled in the art and a detailed explanation thereof is not necessary for an appreciation or understanding of the present invention. In general, the game play area 18 typically includes a first set 22 of game play indicia 20 covered by a scratch-off coating (SOC) 26 and a separate, second set 24 of game play indicia 20 also covered by the SOC 26. In a particular game format, the player scratches off the SOC from both sets 22, 24 and the outcome of the game is determined by the number of matches between the game play indicia 20 in the first set 22 and the second set 24 of game play indicia. Instruction indicia may be provided in the game play area 18 and also covered by the SOC that instructs the player as to how to play the game embodied on the ticket blank 14.

The game outcome is "predetermined" in that the game indicia 20 is preprinted on the ticket blank 14 and the player can take no action to change whether or not the ticket blank 14 is a winning ticket or the prize amount. The lottery ticket blank 14 includes a validation code or number 30 (e.g., a bar code) printed thereon that links the ticket blank 14 to an electronic validation file in a remote server/computer system. The validation file includes the status of the ticket (i.e., winning ticket or losing ticket and prize amount) and enables redemption of the ticket blank 14 (in a finished version) by the player. The validation code 30 may be covered by the SOC or may be provided on the back face 17 of the lottery ticket blank 14 (FIG. 3B).

It should be appreciated that the current system and method embodiments are not limited to any particular type, style, rules, or format of scratch-off game embodied on the lottery ticket blank 14.

Still referring to FIG. 1, a coating layer 25 is applied over at least the game play area 18. FIG. 1 depicts an embodiment wherein the coating layer 25 covers the entire front face 16 of the lottery blank 14 (with a portion removed to show the underlying game play area 18 for illustrative purposes). In this embodiment, the coating layer 25 is selected and applied so that essentially the entirety of the front face 16 presents an "empty" or "blank" canvas 56 that is void of lottery indicia such as graphics, images, instructions, or the like. In other words, a patron viewing the front face 16 has essentially no indication that the article is a scratch-off lottery ticket.

Figure 3A:
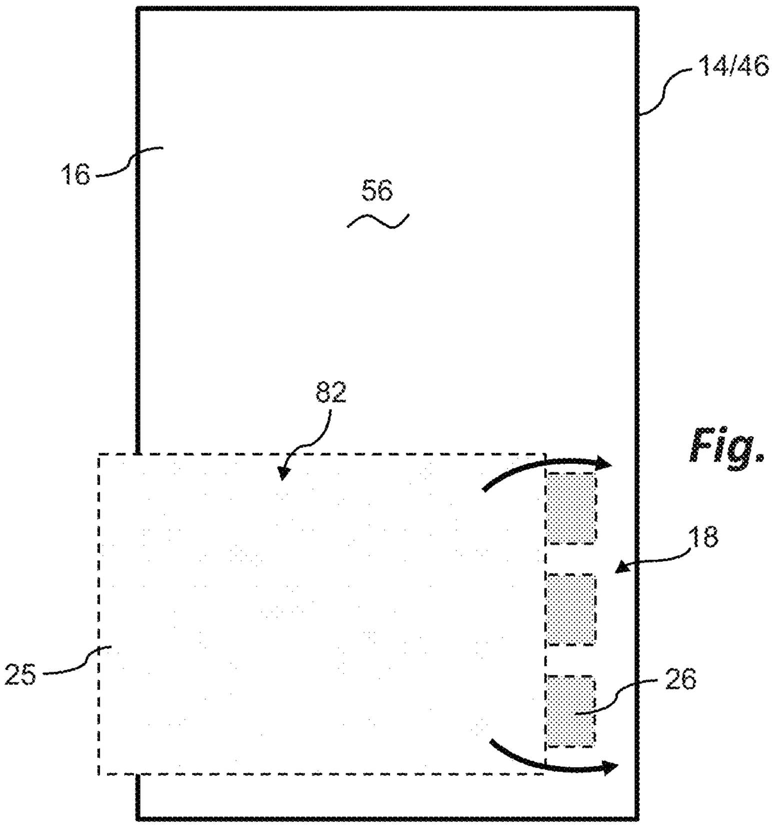
FIG. 3A depicts placement of a coating over the game play area of a scratch-off lottery ticket blank.
Figure 3B:
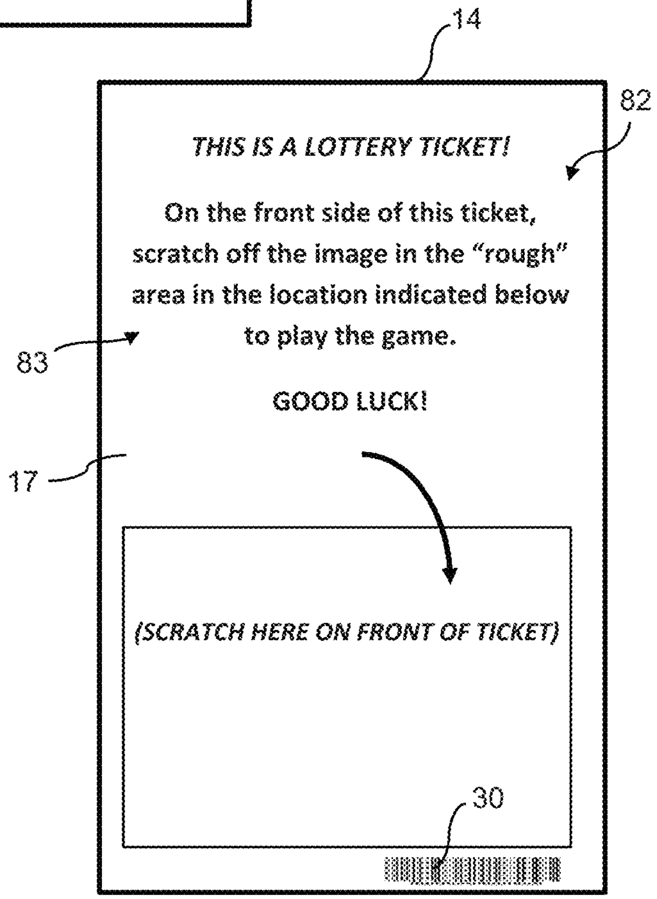
FIG. 3B depicts an embodiment of a back face of the scratch-off lottery ticket blank of FIG. 3A.

FIG. 3A depicts an embodiment wherein the coating layer 25 is applied essentially only over the game play area 18. The remaining portions of the front face 16 are void of any lottery indicia and may simply be the front face of the paper stock used to make the lottery ticket blanks 14. Typically, this paper stock is provided to the ticket manufacturer with a pre-applied coating or finish that is suitable for overprinting of lottery indicia thereon. The coating layer 25 visually matches the remaining portions of the front face 15 such that the remaining portions and the coating layer 25 together define the empty composition area 56.

As mentioned above, the coating layer 25 may be any type of suitable primer coating that "hides" the SOC and any indicia in the game play area 18 and presents a suitable surface for overprinting of the composition indicia thereon.

Thus, the term "primer coating" is used herein generically to encompass any type or formulation of coating that achieves these purposes.

In addition, those skilled in the art understand that scratch-off lottery tickets are typically printed with a number of different layers on a paper stock. These layers can include any combination of security layer, game play indicia layer, protective coating layer, primer layer, release layer, SOC layer, overprint layer, and so forth. The lottery ticket blanks 14 may be initially provided with any suitable combination of layers known and used in the art.

The present system 10 and method 100 are not limited to any particular type of composition indica 53 selected or entered by the patron to be printed on the front face 16 (i.e., in the empty canvas area 56) when composing a finished lottery ticket. For example, FIG. 2 depicts a finished lottery ticket 46 that includes an image or picture 53 supplied by the patron, as well as the indicia (e.g., words) 53 above the image. The composition indicia 53 may include selection of a background color or pattern, a border, or virtually any other type of indicia desired by the patron for printing in the empty canvas area 56. As described below, this composition indicia may be provided by the patron or may be presented to the patron in the form of selectable options.

Thus, the finished lottery ticket 46 is "personalized" by the patron at least to the extent that the patron is essentially the artist that composes the visual appearance of the front face 16 of the finished lottery ticket 46 in the empty canvas area 56.

Referring to FIGS. 3A and 3B, embodiments of the game system 10 and method 100 may also include means 82 for indicating to a player of the finished lottery ticket 46 that the game play area 18 is present on the front face 16 of the finished lottery ticket 46. Depending on how the patron composes the finished lottery ticket 46, it may not appear to the player that the article is indeed a scratch-off lottery ticket. Means 82 can be provided to convey to the player that they are in possession of a scratch-off lottery ticket without overtly displaying or announcing this fact on the front face 16. For example, in one embodiment, the means 82 may include instruction indicia 83 on the back face 17 of the lottery ticket blank 14 (or finished lottery ticket 46) that indicates location of the game play area 18 on the front face 16. The instruction indicia 83 may also include instructions on how to play the game embodied by the game play indicia 20, prize awards, and generally any other information related to play of the game.

In another embodiment, the means 82 may include a tactile feel imparted to the game play area 18 that distinguishes the game play area 18 from the remaining portions of the front face 16. For example, the tactile feel may be a "rougher" or "smoother" feel as compared to other portions of the front face 16 provided by a particular finish of the coating layer 25 applied over the game play area 18. This tactile option for the means 82 may be used alone or along with instruction indicia 83 on the back face 17, as indicated in FIGS. 3A and 3B.

In still another embodiment of the means 82, the patron may be provided with the option to print indicia on the front face when composing the finished lottery ticket 46 that indicates the location of the game play area 18.

Figure 5:
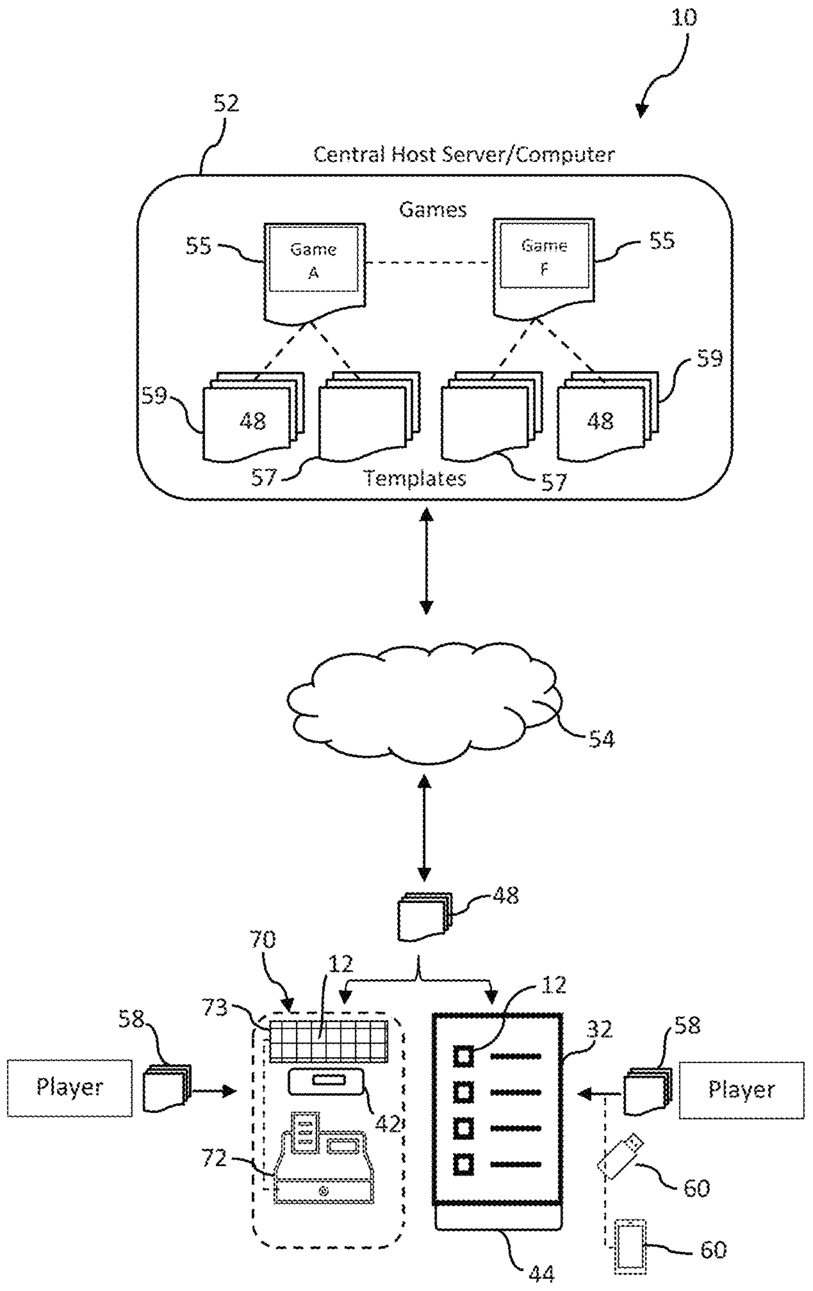
FIG. 5 is a block diagram of a system component and method configuration according to embodiments of the invention.
Figure 6:
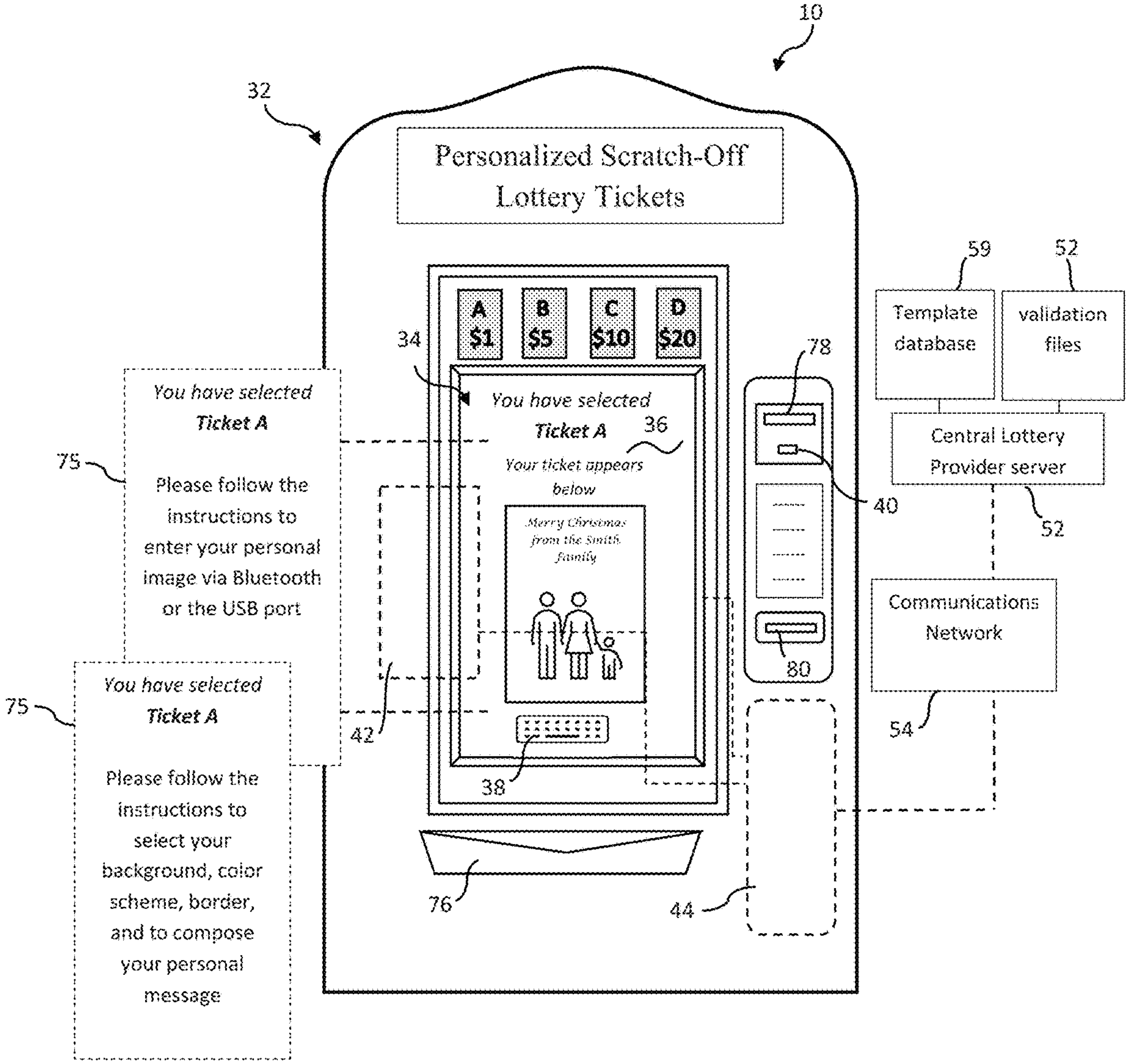
FIG. 6 is a view of a dispenser configured for operation with embodiments of the system and method of the invention.

Referring to FIGS. 5 and 6, the system 10 and method 100 include use of an automated dispenser 32 in which sets 12 (e.g., bundles, rolls, or stacks) of the lottery ticket blanks 14 are housed. With reference to FIG. 6, in one embodiment, the dispenser 32 may be a self-serve vending machine type of dispenser that is designed for direct interaction with players or patrons for selection and purchase of lottery tickets directly via the dispenser 32. Examples of such dispensers 32 include the PlayCentral HD, PlayCentral EX and the PlayCentral 54, offered by Scientific Games Corporation having a principal place of business in Alpharetta, Ga., USA, which may be configured with features and functionalities for practice of the present system 10 and method 100.

In an alternative embodiment also depicted in FIG. 5, the automated dispenser 32 may be embodied as a lottery ticket terminal 72 and associated ticket array 73 at a point-of-sale (POS) location 70 of a retail establishment. For example, Scientific Games Corporation offers Flair™ and Wave™ lottery ticket terminals that may be readily configured by those skilled in the art for a system 10 and method 100 as described herein. A patron's input of composition indicia 53 and request for a finished lottery ticket 46 may be inputted into the lottery ticket terminal 72 by a retail clerk or other employee of the retail establishment by various means. A commercially-available Scientific Games Corporation SciQ™ "smart" lottery ticket dispenser array 73 may be in wired or wireless communication with the terminal 72. This dispenser array includes one or a plurality of individual lottery ticket bins, with each bin typically containing tickets for a different respective lottery ticket game. For example, one bin may contain "Lucky 7" themed scratch-off lottery tickets, while an adjacent bin may contain "Gold Rush" themed scratch-off lottery tickets, and so forth. One or more of the bins may contain sets 12 of the lottery ticket blanks 14 for use with the present system 10 and method 100.

The dispenser 32, whether embodied as a self-serve vending machine as in FIG. 6 or a POS terminal 72/array 73 as in FIG. 5, is associated with a printer 42 that is capable of printing indicia, graphics, photos, or any other matter selected by the player for personalizing the lottery ticket blank 14 with composition indicia 53 before a finished lottery ticket 46 is dispensed via the slot 76 in the dispenser 32 (FIG. 6). Conventional commercial printers, such as an ink jet printer, can be readily configured by one skilled in the art for this purpose.

The automated dispenser 32 includes an interface 34 that is configured to accept a player's input of composition indicia 53 for printing in the empty canvas area 56 by the printer 42. The interface 34 can include any manner of hardware/software configuration. For example, in the embodiment of FIG. 6, the interface 34 may be embodied as an interactive screen 36 that steps the player through the process of selecting options and inputting composition indicia 53 for printing in the empty canvas area 56. The process may include the use of sequentially displayed windows 75 that step the player through the various options and data input process. The interface may also include a keyboard 38 or touchscreen.

When the dispenser 32 is embodied as terminal 72 configured with a ticket array 73 (FIG. 5), the interface 34 may include a clerk-operated device, such as an interactive screen, keyboard, scanner or other device in communication with the terminal 72 and array 73.

Referring to FIG. 6, the dispenser 32 may include a plurality of the sets of scratch-off lottery ticket blanks 14 for different games (games A-D) having a different purchase price and prize structure. For example, the dispenser may offer a $1, $5, $10, and $20 scratch-off ticket, wherein each lottery ticket blank 14 is associated with a game having a different prize structure (i.e., greater prizes for more expensive tickets).

Referring to FIGS. 5 and 6, the dispenser 32 includes a controller 44 that is in communication with the interface 34 and the printer 42. The controller 44 is configured to process various commands and control the hardware components of the dispenser 32 for printing and dispensing the finished lottery ticket 46 (FIG. 2) therefrom. In the POS station 70 embodiment depicted in FIG. 5, the controller 44 may be operably associated with the terminal 72.

In a particular embodiment of the system 10 and method 100, the controller 44 has access to or contains a plurality of digital indicia templates 48 (FIG. 4) to present to the player via the interface 34 (e.g., via the interactive screen 36). The indicia templates 48 may be stored in an internal memory within the controller 44 or in an external storage 59 (FIG. 5) that is accessible by the controller 44 (or downloaded from the storage 59 to the controller 44).

Figure 4:
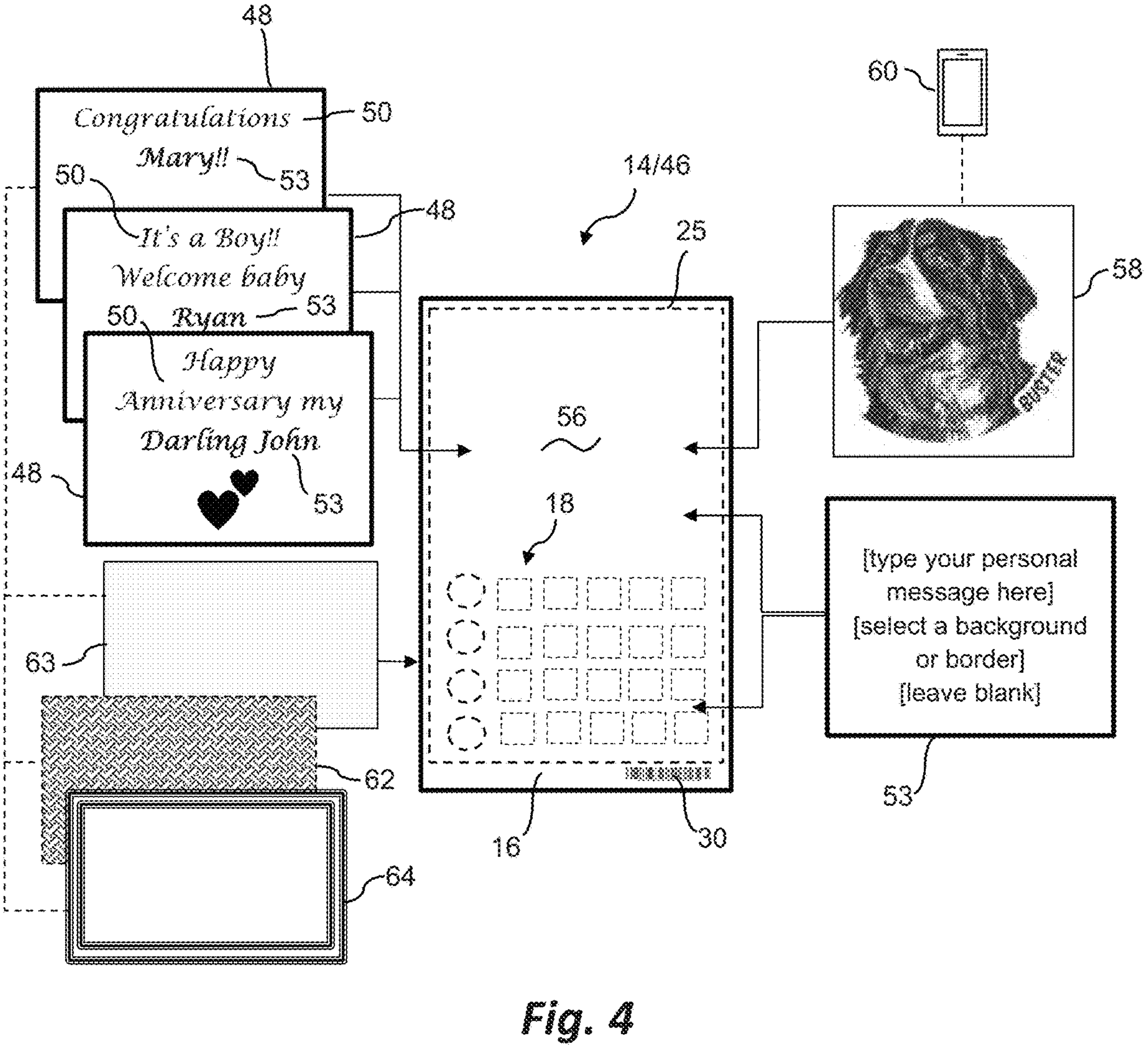
FIG. 4 is a diagram depicting aspects of making a finished lottery ticket from a lottery ticket blank according to an embodiment of the invention.

Referring to FIG. 4, the indicia templates 48 are provided to the patron as options to use when composing the finished lottery ticket 46 and may contain any manner of static indicia 50 that can be further modified or combined with additional composition indicia 53 that is entered by the player via the interface 34. For example, as depicted in FIG. 4, an indicia template 48 may be provided for various special events, such as a birthday, anniversary, birth announcement, etc. The indicia 50 is "static" in that it is a feature of the template 48 that is not changeable by the player input. The templates 48 may be added to or modified with the composition player indicia 53, such as by adding a name, date, or other information to the template 48 (as indicated by the highlighted names in the templates 48 of FIG. 4) via the interface 34.

Still referring to FIG. 4, via the interface 34, the player may also be presented with options for different background colors 63, patterns 62, or borders 64 for use as a part of the composition indicia 53.

Referring to FIG. 5, the controller 44 associated with the dispenser 32 may be in communication (via a communication network 54) with a central game server 52 that is managed by a game provider. This server 52 may initially store sets of templates 48 for a number of different games (e.g., Game A through F). The templates 48 may be downloaded to the controller 44 on a periodic basis or when a purchase is initiated for an individual ticket at the terminal 72 or dispenser 32. The templates 48 stored remotely at the central server 52 or locally at the controller 44 may also be updated by the central server 52 as needed.

In general, communication between the central host server 52 and controller 44 can be carried via a network interface 54 using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL). It should be appreciated that the central host server 52 can include a network interface for providing communications over the network 54. A network interface can include any suitable components for interfacing with one more networks, including for example, transmitters, receivers, ports, controllers, antennas, or other suitable components.

The central host server 52 can be any computing device and can include one or more processors and one or more computer-readable media. The computer-readable media can store instructions which cause the processor to perform the operations described herein, as well as other functions related to conduct of the overall game for the lottery authority.

FIGS. 4 and 5 also depict an embodiment wherein the player has the option to import an external image 58, such as a photograph or other digital image, from an external storage device 60 (e.g., a mobile phone or flash drive) as composition indicia 53 for printing in the empty canvas area 56. The image may be combined with any one or more of the templates 48, background options 62, 63, borders 64, and so forth. The dispenser 32 (particularly the interface 34 and controller 44) is configured to communicate with the external storage device 60 to accept the external image 58. For example, the dispenser may be configured with a USB port to accept an external flash drive presented by the player. Alternatively, the dispenser may be configured for a wireless exchange of the external image 58 from the player's storage device 60 (e.g., via Bluetooth).

Referring again to FIG. 3, the player may also be presented with the option to purchase the lottery ticket blank 14 without adding composition indicia 53 of any type to the empty canvas composition area 56. This option may be desirable to many players in that they are free to compose virtually any manner of highly personalized art, design, message, and so forth, in the empty canvas area 56 at a later time using any means they desire, such as paint, ink, stick-on materials, and so forth.

Figure 7:
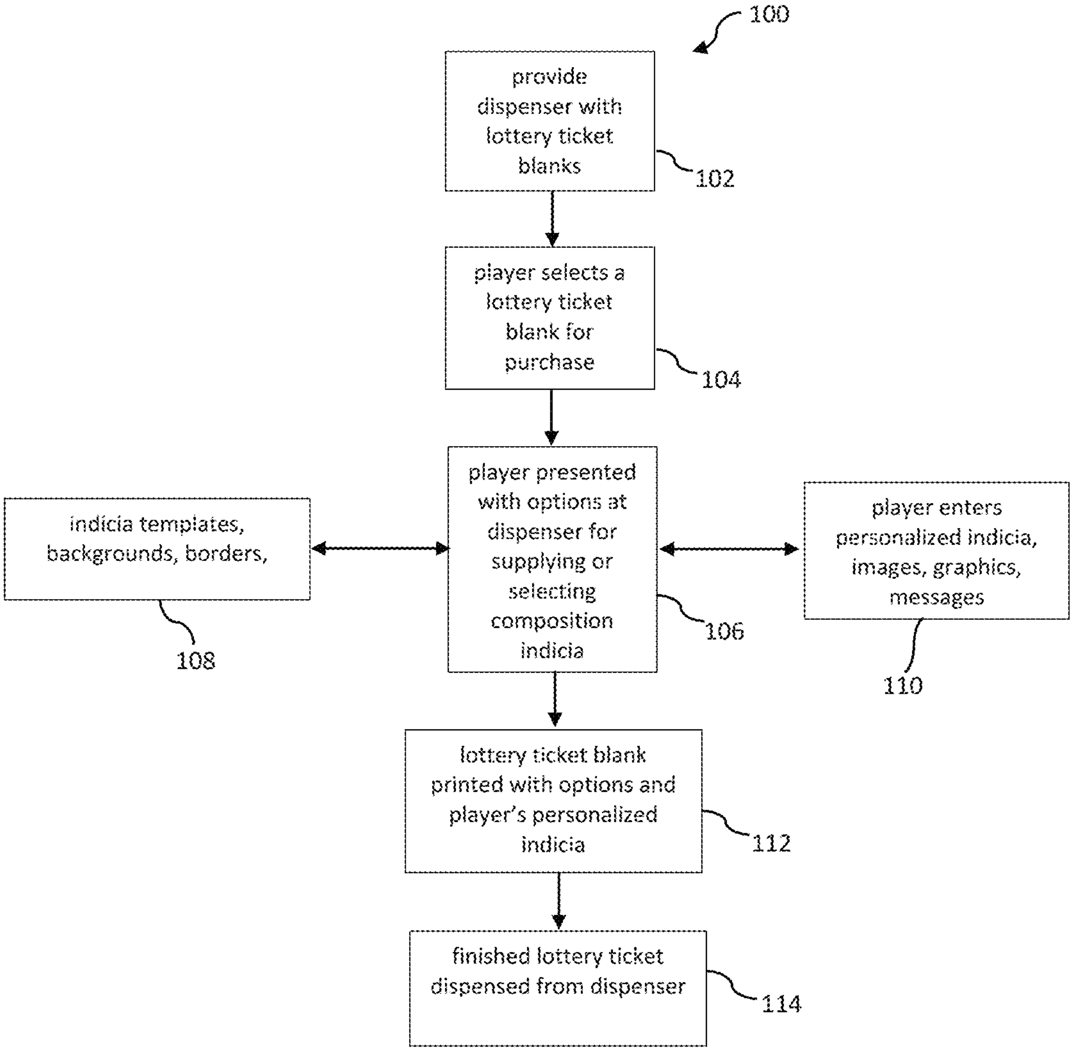
FIG. 7 is a block diagram according to a method embodiment of the invention.

The present invention also encompasses various method embodiments for conducting an instant lottery game with composition scratch-off lottery tickets. FIG. 7 depicts an embodiment of such a method 100, aspects of which are discussed above.

At step 102, an automated dispenser (vending-machine type or POS terminal based) is supplied with one or more sets of lottery ticket blanks described above.

Step 104 indicates that the patron makes a selection of one of the lottery ticket blanks for purchase.

At step 106, via the interface configured with the dispenser, the player is presented with options for personalizing the lottery ticket blank by supplying or selecting composition indicia. Step 108 indicates that the options may be presented by way of indicia templates, background and border selections, and so forth. Step 110 indicates that, via the interface, the player enters composition indicia, such as (but not limited to) images, graphics, messages, and so forth, as discussed above.

At step 112, via a printer configured with the dispenser, the lottery ticket blanks are printed with the player's selected options and composition indicia to generate a finished lottery ticket.

At step 114, the finished lottery ticket is dispensed from the dispenser.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. An instant lottery ticket game system, comprising:
- a set of scratch-off lottery ticket blanks, each lottery ticket blank comprising a front face and a back face;
- each lottery ticket blank further comprising a game play area on the front face with play indicia that presents a pre-determined game outcome, the play indicia covered by a scratch-off coating (SOC);
- a coating layer applied over at least the game play area;
- an entirety of the front face presenting an empty composition area void devoid of lottery ticket indicia such that a patron is able to cover the entirety of the front face with composition indicia determined and input by the patron, the composition indicia devoid of lottery ticket indicia;
- an automated dispenser, the set of lottery ticket blanks housed within the dispenser;
- an interface configured with the dispenser and in communication with a printer associated with the dispenser;
- a controller configured to operate the interface and the printer as follows:
  - accept input from a patron of the composition indicia that is devoid of lottery ticket indicia for printing on the front face such that the patron is enabled to cover the entirety of the front face with the composition indicia;
  - print the composition indicia received from or selected by the patron on portions of or the entirety of the front face to generate a finished scratch-off lottery ticket; and
  - dispense the finished lottery ticket from the dispenser.

2. The instant lottery ticket game system as in claim 1, wherein the coating layer is applied entirely over the front face of the lottery ticket blank and provides the empty composition area with a continuous single color appearance for the patron to compose the finished lottery ticket using the composition indicia.

3. The instant lottery ticket game system as in claim 2, wherein the coating layer comprises a primer coating suitable for overprinting of the composition indicia thereon.

4. The instant lottery ticket game system as in claim 1, wherein the coating layer is applied only over the game play area and comprises a primer coating suitable for overprinting of the composition indicia thereon, the primer coating visually matching remaining portions of the front face such that the remaining portions and the coating layer define the empty composition area.

5. The instant lottery ticket game system as in claim 1, further comprising means for indicating to a player of the finished lottery ticket that the game play area is present on the front face of the finished lottery ticket.

6. The instant lottery ticket game system as in claim 5, wherein the means comprises instruction indicia on the back face of the lottery ticket blank that indicates location of the game play area on the front face.

7. The instant lottery ticket game system as in claim 5, wherein the means comprises a tactile feel imparted to the game play area that distinguishes the game play area from the remaining portions of the front face.

8. The instant lottery ticket game system as in claim 7, wherein the tactile feel is provided by the coating layer applied over the SOC.

9. The instant lottery ticket game system as in claim 1, wherein the controller is further configured to present a plurality of digital indicia templates to the patron via the interface to use a part of the composition indicia on the front face.

10. The instant lottery ticket game system as in claim 9, wherein the controller is in communication with a central game server, the indicia templates updated or downloaded to the controller by the central game server.

11. The instant lottery ticket game system as in claim 9, wherein the indicia templates comprise static indicia associated with a particular event or occasion.

12. The instant lottery ticket game system as in claim 9, wherein the interface and controller are configured to accept an external image presented by the patron as the composition indicia, the external image being a digital image in an external storage device presented by the patron, the interface comprising means for communicating with the external storage device to accept the digital image.

13. The instant lottery ticket game system as in claim 9, wherein the interface and controller are configured to present to the patron options for backgrounds or borders to be printed on the front face as part of the composition indicia.

14. The instant lottery ticket game system as in claim 9, wherein the interface and controller are configured to present to the player an option to purchase the lottery ticket blank without printing the composition indicia or any other indicia on the front face.

15. The instant lottery ticket game system as in claim 1, wherein the dispenser comprises a plurality of the sets of scratch-off lottery ticket blanks for different games having a different purchase price and prize structure.

* * * * *